US012529253B2

(12) United States Patent
Cafuta

(10) Patent No.: US 12,529,253 B2
(45) Date of Patent: Jan. 20, 2026

(54) WEIGHT COMPENSATION FOR VERTICALLY MOVABLE FAÇADE COMPONENTS

(71) Applicant: BEWISO GMBH, Wildon (AT)

(72) Inventor: Thomas Cafuta, Wildon (AT)

(73) Assignee: BEWISO GMBH, Wildon (AT)

( * ) Notice: Subject to any disclaimer, the term of this patent is extended or adjusted under 35 U.S.C. 154(b) by 121 days.

(21) Appl. No.: 17/920,670

(22) PCT Filed: Apr. 22, 2021

(86) PCT No.: PCT/EP2021/060575
§ 371 (c)(1),
(2) Date: Oct. 21, 2022

(87) PCT Pub. No.: WO2021/214247
PCT Pub. Date: Oct. 28, 2021

(65) Prior Publication Data

US 2023/0151663 A1 May 18, 2023

(30) Foreign Application Priority Data

Apr. 22, 2020 (DE) ..................... 10 2020 110 953.9

(51) Int. Cl.
*E05D 13/00* (2006.01)

(52) U.S. Cl.
CPC ....... *E05D 13/123* (2013.01); *E05D 13/1207* (2013.01); *E05Y 2201/478* (2013.01); *E05Y 2201/71* (2013.01); *E05Y 2900/148* (2013.01)

(58) Field of Classification Search
CPC ... E05D 13/123; E05D 13/1207; E05D 13/12; E05Y 2201/478; E05Y 2201/71; E05Y 2900/148

(Continued)

(56) References Cited

U.S. PATENT DOCUMENTS 1,590,473 A * 6/1926 Miller .................. E05F 15/665 49/118
2,059,436 A * 11/1936 Campbell ............... E05F 11/48 49/99

(Continued)

FOREIGN PATENT DOCUMENTS

CA 2685483 A1 * 5/2010 ......... E05D 13/1207
CN 107905685 A * 4/2018

(Continued)

OTHER PUBLICATIONS

International Search Report for Application No. PCT/EP2021/060575 mailed Jul. 21, 2021. 4 pages.

*Primary Examiner* — Marcus Menezes
(74) *Attorney, Agent, or Firm* — Lerner David LLP

(57) ABSTRACT

In order to improve operability and user comfort for vertically sliding or displaceable facade components, a weight compensation device for vertically displaceable facade components includes a spring element for at least partial compensation of its own weight of a vertically displaceable facade component and a compensator. The spring element provides a spring force as a driving force ($F_{AN}$) for lifting the vertically displaceable facade component. The spring element is movable between a compressed state ($P_K$) and an expanded state ($P_E$). The spring force has a decreasing value when moving from the compressed state to the expanded state. The compensator at least partially compensates for the decrease in the input force and provides an output force ($F_{AB}$) that decreases less than the input force.

13 Claims, 4 Drawing Sheets

(58) Field of Classification Search
USPC .................................................... 49/445, 447
See application file for complete search history.

(56) References Cited

U.S. PATENT DOCUMENTS

| | | | | | |
|---|---|---|---|---|---|
| 4,012,008 | A * | 3/1977 | Hosooka | E05D 13/1276 242/376 |
| 4,760,622 | A | 8/1988 | Rohrman | |
| 4,914,780 | A * | 4/1990 | Rogers | E05D 13/123 49/446 |
| 5,144,770 | A * | 9/1992 | Kraus | E05F 11/48 49/362 |
| 5,595,026 | A * | 1/1997 | Licking | E05F 15/57 49/360 |
| 7,908,796 | B2 * | 3/2011 | Hancock | E06B 3/44 49/447 |
| 9,003,705 | B1 * | 4/2015 | Solowiej | E06B 7/32 49/169 |
| 9,038,317 | B2 * | 5/2015 | Hansen | E05F 15/665 49/360 |
| 9,797,182 | B2 * | 10/2017 | Raap | E05F 15/665 |
| 10,253,543 | B2 * | 4/2019 | Newman | E05F 11/40 |
| 11,725,450 | B2 * | 8/2023 | Belding | E05F 15/77 49/31 |
| 2003/0024167 | A1 * | 2/2003 | Cheng | E06B 3/4423 49/374 |
| 2005/0091926 | A1 * | 5/2005 | Kinsey | E05D 15/22 49/187 |
| 2005/0229494 | A1 * | 10/2005 | Harari | E05D 15/0669 49/360 |
| 2012/0047801 | A1 * | 3/2012 | Hogan | A01G 9/022 47/65.5 |
| 2014/0150346 | A1 * | 6/2014 | DeBoer | E05D 13/14 49/506 |
| 2023/0151663 | A1 * | 5/2023 | Cafuta | E05D 13/123 49/429 |

FOREIGN PATENT DOCUMENTS

| | | | | |
|---|---|---|---|---|
| CN | 109610969 | A * | 4/2019 | |
| CN | 116357196 | A * | 6/2023 | |
| DE | 606330 | C | 11/1934 | |
| DE | 4431205 | A1 | 4/1995 | |
| EP | 2175098 | A1 * | 4/2010 | E05D 15/5211 |
| EP | 2458130 | A1 | 5/2012 | |
| GB | 430457 | A | 6/1935 | |
| GB | 2535506 | A * | 8/2016 | E04F 10/0607 |
| GB | 2543120 | A * | 4/2017 | A47B 88/493 |
| GB | 2604869 | A * | 9/2022 | E05F 15/665 |
| JP | 2001065274 | A * | 3/2001 | |
| WO | WO-03012237 | A1 * | 2/2003 | E05F 15/41 |
| WO | WO-2006090161 | A2 * | 8/2006 | E05D 15/18 |
| WO | WO-2021214247 | A1 * | 10/2021 | E05D 13/12 |

* cited by examiner

WEIGHT COMPENSATION FOR VERTICALLY MOVABLE FAÇADE COMPONENTS

FIELD OF INVENTION

The present invention relates to vertically displaceable facade components. In particular, the present invention relates to a weight compensation device for vertically displaceable facade components, to a facade module and to a method for moving a vertically displaceable facade component.

BACKGROUND OF THE INVENTION

In case of vertically movable facade components, for example vertical sliding windows, a movement, for example for opening and closing, can take place in the vertical direction. In this case, it is necessary to dissipate the weight force resulting from the own weight of the facade component during the movement so that the entire weight does not have to be lifted during operation. In case of windows that can be pivoted about an axis, the own weight can be transferred to the facade structure via the pivot bearings (e.g. hinges). In case of horizontally sliding components, for example, the weight can be transferred via the bearings, e.g. roller bearings. In case of vertically sliding facade components, e.g. vertical sliding windows, counterweights are used, for example, to compensate for the weight of the sash. Instead of weights, spring elements are also used, for example coil springs. Counterweights or spring elements are placed, for example, in lateral frame areas. In case of so-called double-sash vertical sliding windows, both sashes can also be designed to counterbalance each other. However, the movement can then only be synchronous. Additional installation space for weights or spring elements is not required for this variant. Vertically moving components are used in facades for various reasons. It has become apparent that, in addition to motorized moving facade components, manual operation is also of increasing interest, and expectations of user comfort have risen.

SUMMARY OF THE INVENTION

It is an object of the present invention to improve the operability, i.e. user comfort, of vertically sliding facade components.

This is achieved by the subject-matter of the independent claims; in particular by a weight compensation device for vertically displaceable facade component, by a facade module and by a method for moving a vertically displaceable facade component according to one of the independent claims. Exemplary embodiments are provided in the dependent claims.

According to the invention, a weight compensation device is provided for vertically displaceable facade components. The weight compensation device has a spring element for at least partial compensation of its own weight of a vertically displaceable facade component and a compensator. The spring element provides a spring force as a driving force for lifting the vertically displaceable facade component. The spring element can be moved between a compressed state and an expanded state, i.e. it can be moved back and forth between these two states against the spring force. The spring force has a decreasing value when moving from the compressed state to the expanded state. The compensator at least partially compensates for the decrease in the driving force and provides an output force that decreases less than the driving force.

The term "weight compensation device" refers to a device used to absorb the weight of the vertically displaceable facade components or to counteract the weight in such a way that the vertically displaceable facade component can be moved up and down manually in the vertical direction, i.e. can be displaced. The weight compensation device thus serves to compensate the force resulting from the weight.

The term "vertically movable facade component" refers to a movable element in a facade of a building. The movement occurs in the vertical direction primarily by translation. The movement can also be referred to as vertical sliding. An example of a vertically sliding facade component are vertical sliding windows. In addition to the sliding movement, tilting or rotating movements can also be provided for locking and unlocking or closing and opening operations for vertical sliding windows. Another example are vertically movable panels for sun protection, glare protection, ventilation and visual protection or elements for daylight utilization or for energy generation from solar radiation.

The term "vertically movable facade component" refers to vertically movable components in which openings such as windows, passages, access points, etc., are closed or opened. The closing and opening of the openings refers to the control or adjustment of the passage of air, light, temperature, people and also objects and, in addition to the actual closures such as doors and windows, also includes components for light control, such as glare protection, privacy protection, daylight control or also covers. The vertically sliding facade component can therefore also be referred to as a vertically sliding building component or vertically sliding building component or vertically sliding component.

The term "spring element" refers to a component that applies a resilient force. The spring element can be moved between a strongly pressed state, i.e. compressed, and a less compressed state, i.e. expanded. Expanded in the present context therefore means less compressed, or simply further apart.

The term "to at least partially compensate" refers to compensation to a large extent. For example, complete compensation takes place.

The term "own weight" refers to the weight of the vertically sliding facade component that has not yet been removed when installed. If, for example, smaller counterweights or similar are present but only partially compensate for the weight, the spring element serves to partially compensate for the remaining weight.

The term "compensator" refers to a measure intended to at least partially compensate for an unequal parameter. The compensator thus takes over, for example, the compensation of the unequally occurring values of a certain force.

The term "driving force for lifting" refers to the force generated by the spring element that acts on the vertically displaceable facade component in an upward orientation. Similar to a lifting force, the driving force acts against the force of gravity, i.e. against the weight.

The term "compressed state" refers to a first state in which the spring element is more compressed than in a second state.

The term "expanded state" refers to the second state in which the spring element is less compressed than in the first state.

The term "decreasing value" refers to the fact that the force becomes less, i.e. it becomes smaller.

The term "at least partially compensated" refers to compensation to a large or substantial degree. In an example, the decreasing driving force is fully compensated. In this case, not the entire force is compensated, but only the deviation, i.e. the difference that forms.

The term "downforce" refers to the force transmitted to the vertically displaceable facade component in order to compensate for its weight force. The downforce is the force ultimately effective on the facade component. The output force can also be referred to as the effective force for lifting, or the lifting force, or the lifting force, or the weight-compensating force.

The term "decreases less" refers to the fact that the force remains constant, or does not decrease as much.

The driving force for lifting can also be referred to as the driving force for at least partial compensation of the weight.

The compensator can also be referred to as a balancing device or compensation device. The compensator is designed to keep the output force, i.e. the output force for weight compensation, as constant as possible. The compensator counteracts the change in the spring force of the spring element and compensates for the decrease, at least partially, so that the vertically displaceable facade component is held with a holding force that is as constant as possible and the weight of the vertically displaceable facade component can be compensated with the holding force.

The result is that the facade component is easier to operate, i.e. move, since it requires less force, and more comfortable to operate, i.e. move, since it requires uniform force. The spring force of the spring element can thus be used specifically as a counterweight for vertical sliding windows, for example. A vertical sliding window can, for example, be guided laterally via bearings, so that when the (window) weight is compensated by the weight compensation device, the user only has to be overcome the slight friction of the bearings to move the sash. Compensation for a difference in spring force by, for example, the targeted use of seals that generate friction, so that the sash neither unintentionally sags nor unintentionally rises in the event of differences in the holding force, is not necessary.

According to an example, the compensator has a force input and a force output. A gear mechanism is provided between the force input and the force output, the gear transmission ratio of which changes when moving from the compressed state to the expanded state and becomes smaller or larger, for example.

In a first example, the gear ratio of the transmission decreases when moving from the compressed state to the expanded state and increases in the reverse direction, for example, when the spring force of the spring element decreases when moving from the compressed state to the expanded state.

In a second example, the gear transmission ratio of the transmission increases when moving from the compressed state to the expanded state and decreases in the reverse direction, for example, when the spring force of the spring element decreases when moving from the expanded state to the compressed state.

In an example, a spring element is provided that is compressible from an initial state, to use the spring force resulting from the compression to counteract the weight force resulting from its own weight.

For example, the spring force decreases from the compressed state to the expanded state. The gear transmission ratio of the gear mechanism becomes smaller when moving from the compressed state to the expanded state and becomes larger vice versa, i.e. when moving from the expanded state to the compressed state.

In another example, a spring element is provided that is expandable, i.e. stretchable or extensible, from an initial state to use the spring force resulting from the expansion, i.e. stretching or extension, to counteract the weight force resulting from its own weight.

For example, the spring force decreases from the expanded, i.e. stretched, state to the initial state. The gear transmission ratio of the gear mechanism decreases when moving from the expanded, i.e. stretched, state to the initial state and increases vice versa, i.e. when moving from the initial state to the expanded, i.e. stretched, state.

In an example, the compensator has a force input and a force output. Between the force input and the force output is provided a gear mechanism whose gear transmission ratio decreases when moving from the compressed state to the expanded state and vice versa, i.e. increases when moving from the expanded state to the compressed state of the spring element, i.e. whose gear transmission ratio decreases when moving from the compressed state to the expanded state and whose gear transmission ratio increases when moving from the expanded state to the compressed state.

The term "gear mechanism" refers to a mechanically effective component that converts an incoming force into an outgoing force and has a converting effect in the process, for example by a gearing-up or a gearing-down.

In an example, the compensator provides at least partial compensation for the driving force that decreases when moving from the compressed state to the expanded state, so that an output force that decreases less than the spring force is available to compensate for the weight of the vertically displaceable facade component. Preferably, the output force is constant over the movement of the vertically displaceable facade component.

In an example, the compensator provides partial compensation for the spring force that decreases when moving from the compressed state to the expanded state, so that an output force that decreases less than the spring force is available to compensate for the weight of the vertically sliding facade component.

The compensator can be arranged between the spring element and the vertically displaceable facade component.

According to an example, the gear mechanism comprises a cable reel on which a cable can be wound, which can be connected to the vertically displaceable facade component As an option, it is provided that the cable reel is rotationally driven by the spring element.

As a further option, it is provided that the cable reel for a winding cable has a decreasing winding circumference.

This is useful, for example, if the spring force decreases as the spring element expands. The decreasing winding circumference means a decreasing lever of the cable engaging the reel, at the other end of which the weight force, i.e. the weight, is applied.

In another example, it is provided that the cable reel for a winding cable has an increasing winding circumference when, for example, the spring force increases with an expanding spring element. The increasing winding circumference means an increasing lever of the cable engaging the reel, at the other end of which the weight force, i.e. the weight, is applied.

The term "cable reel" refers to a device for winding and un-winding a cable. The cable reel is cone-shaped, for example.

The term "winding circumference" refers to the effective outer surface of the cable reel against which the cable rests during winding and un-winding. The winding circumference defines the distance of the cable laying against the cable reel from the axis of rotation of the shaft. The winding circumference therefore represents a lever for the transmission of the force.

According to an example, the spring element displaces the cable reel during the winding process in the pulling direction of the cable winding on the reel, so that the vertically displaceable facade component is movable by a stroke composed of two movements. In one movement, the cable can be wound onto the cable reel, and in another movement, the cable reel can be displaced. Optionally, both movements can be executed simultaneously.

One movement can also be called the first movement, and the other movement can be called the second movement.

In the first movement, the cable reel is driven in rotation and in the second movement, the pivot point of the cable reel is displaced, i.e. shifted. The first and the second movement take place simultaneously. The shifting of the pivot point can therefore also be called the first movement and the turning the second movement.

This allows a more compact design and smaller dimensions compared to weight compensation with a pure spring element, such as a pneumatic spring, since the stroke of the spring element is supplemented by the take-up length.

The displacement of the reel itself causes, for example, a sliding sash to lift by the same distance by which the reel is displaced, if the rotary motion of the reel is disregarded. The rotational movement of the reel has the effect of winding up the cable and thus lifting the sash. Both movements at the same time generate the required constant force curve. The combination of the two motions results in an addition of the two lifting motions, i.e. the total lift is greater. This in turn means that the weight compensation device can be dimensioned smaller.

For example, this allows to accommodate the counterweight device with a horizontal cross-section of approx. W/D 45 mm×85 mm in a duct. This is ideal, for example, for use in facade systems in which vertical members are designed as hollow sections.

In an example, a sliding component, for example a vertically sliding window sash, is provided which has a weight compensation device on each side, i.e. a weight compensation device is provided on each of the right and left sides.

In another example, a sliding component is provided in which only one counterweight device is provided, e.g. on the right or left. For the other side, a cable guide is provided to the side of the counterweight device, for example via deflection pulleys.

In another example, two sliding components are provided, each having a compensation device on both sides, i.e. one compensation device per sash is provided on the right and one on the left, for a total of four compensation devices.

In another example, two sliding components are provided, in each of which only one weight compensation device is provided, e.g. right or left for one sash and likewise right or left for the other sash. For the respective other side, cable guides are provided to the side of the respective compensation device. In an option, both compensation devices are arranged on the same side, i.e. both on the left or both on the right. In another option, both weight compensation devices are arranged on different sides, i.e. one on the left and one on the right.

In a first variant, the weight compensation device is arranged vertically when installed. For example, in a vertical sliding window, the compensation device is located next to the window area, on the right or left or on both sides.

In a second variant, the weight compensation device is arranged horizontally when installed. For example, in case of a vertical sliding window, the weight compensation device is located below and/or above the window area. Corresponding deflection pulleys are then provided for the cable guide.

In another variant, two sashes of a vertical sliding window are provided. The sashes are both suspended by tension elements, e.g. cables or chains, via respective primary deflection pulleys. From the primary deflection pulleys, the respective tension elements run back down to a common secondary deflection pulley, where the two tension elements are connected to each other. The secondary deflection pulley is held by an example of the weight compensation device, i.e. tensioned downwards.

On the one hand, the two wings can be moved together. For example, the lower sash can be raised and the upper sash can be lowered at the same time. If one of the two wings is locked, the other can still be moved due to the weight compensation device.

For example, the lower and upper wings are connected by a cable. This cable is guided by fixed (primary) pulleys mounted at the top, while the third (secondary) pulley can be moved in height and is connected directly to the cable, which is wound or un-wound on the conical reel of the weight compensation device. In the initial position, the upper wing is at the top and the lower wing at the bottom. The weight of both wings is supported by the compensation device. The piston of the pneumatic spring of the weight compensation device is half expanded, and the conical reel is half rolled up: When the lower wing is raised and the upper wing is lowered at the same time, the secondary pulley remains in the same position. When the lower wing is raised but the upper wing is not moved, the secondary pulley moves in the direction of the conical reel of the compensation device, the reel rolls up the cable. When the wing is pushed back to the initial position, i.e. closed, the secondary deflection pulley also shifts and the cable is un-wound from the reel, the piston is pushed into the cylinder. When the upper sash is pushed down, but the lower sash remains closed, the secondary pulley shifts away from the conical reel of the compensation device, the reel un-winds cable and the piston is pushed into the cylinder. The whole process is reversed when the sash is closed again. In a situation where both wings are down, if both wings are pushed up at the same time, the secondary deflection moves towards the conical reel, it rolls up cable and the piston of the pneumatic spring expands.

In an example, a weight compensation device is provided on the right and left respectively.

In another example, a weight compensation device is provided on one side only, and the holding force is transmitted to the other side via pulleys.

The compensation device is also called a “balancer”.

However, the small dimensions are particularly suitable for use in existing window constructions, for example when the building envelope is to be upgraded in terms of energy efficiency or building physics as part of renovations or refurbishments and old windows are to be replaced with new windows. The small dimensions of the counterweight device allow it to be used, for example, in the lateral areas or shafts where the counterweights are usually housed.

In an example, the spring element is a linear spring element having a first end and a second end. The first end is attachable to a structural member of the facade and the second end is movable in the longitudinal direction of the spring element between a compressed and an expanded position of the spring element. The cable reel is connected to the second end and moves with the second end during the winding process. The cable reel is rotatably supported on the second end.

The compressed position can also be referred to as the retracted position, and the expanded position as the extended position.

According to an example, the gear mechanism has a shaft which is rotatably drivable by the spring element on an input side and which has the cable reel on an output side.

The shaft is displaceably mounted or displaceably guided in a direction transverse to the shaft axis.

According to an example, the shaft has a gear wheel on the drive side that meshes in a fixed toothed rack profile. The spring element moves the shaft with the gear wheel attached to it linearly transverse to the shaft axis and thereby drives the shaft in rotation.

As an option, it is provided that the cable is attached to the cable reel and by the rotation the cable reel can be wound and un-wound.

Optionally, the cable can be wound onto the cable reel by moving the spring element from the compressed state to the expanded state.

According to an example, the gear wheel is interchangeable and different sized gear wheels are provided to change the lifting force and lifting height of the compensation device.

By using differently dimensioned gear wheels, i.e. gear wheels with different diameters, it is possible to change the lifting force by the pneumatic spring and the lifting height in general, i.e. to increase or decrease it. In relation to the distance the gear wheel travels on the rack, a larger gear wheel reduces the number of revolutions of the reel and, with the force of the pneumatic spring remaining unchanged, this increases the lever force, or a smaller gear wheel increases the number of revolutions of the reel and, with the force of the pneumatic spring remaining unchanged, this reduces the lever force. In relation to the distance covered by the gear wheel on the rack, a smaller gear wheel increases the stroke height due to changing windings, or a larger gear wheel reduces the stroke height due to changing windings.

The differently sized gears form a kind of kit or system that allows easy adjustment to a given actual sash weight.

The interchangeable gear wheel can be used to match a given spatial situation. Due to the interchangeable gear, different sash heights are possible with the same spring element.

The adjustable spring force of the pneumatic spring can be used to adjust to different sash weights. Due to the adjustable pressure, different sash weights are possible with the same spring element.

According to an example, the cable reel has a cone-shaped winding body in which, as an option, a spirally extending winding groove is provided for receiving the cable.

The conical reel is used to compensate for the changing force curve of the pneumatic spring.

The term "winding groove" refers to a recess, i.e. receptacle for the cable during the winding process. The cable is supported in the groove and thus guided laterally. This provides a defined position for the cable during winding and un-winding.

The shaft is spatially displaced by the spring element in a direction transverse to the shaft axis, for example perpendicular to the shaft axis. At the same time, the shaft is also rotated because the gear wheel is in mesh with the toothed rack profile.

According to an example, the spring element is a linear spring element.

As an option, the spring element is designed as a pneumatic spring.

In an example, the spring element is designed as a gas pressure spring.

In another example, the spring element is designed as a gas tension spring. In the examples described and shown in more detail using a pressure element, a partially reversed direction would then be provided.

According to an example, the pneumatic spring has a valve inserted transversely to the spring direction, which is accessible in the installed state. The pneumatic spring can be filled and emptied via the valve so that the spring force can be changed in the installed state.

For example, when installed, the valve faces forward, i.e. towards the interior, and can thus be easily filled or emptied.

According to an example, the pneumatic spring is adjustable for a sash weight in a range between 10 and 400 kg when installed.

The pneumatic spring can be adjusted to the weight to be lifted when installed. With the valve facing forward (inward), filling or emptying of the cylinder is enabled. The weight adjustment can be performed under load. This has the advantage that an exact design of the system, which has to be carried out beforehand, is not necessary.

As an option, a system is provided in which the inherently same design can be used for different weight situations. For example, the pneumatic spring can be adapted to a weight that changes during operation, e.g. to a changed glass weight, such as sound-insulating glass, without the need to replace the complete component.

According to an example, the pneumatic spring has a cylinder and a piston. The cylinder can be supported at one end at a holding point in a facade. The piston is connected to the shaft at its end. The piston is movably held in a guide. When the piston is pushed out, the shaft, which is rotatably mounted at the end of the piston, can be driven via a gear wheel and toothed rack profile. With the cable reel attached to the shaft with the decreasing winding circumference, a torque for winding up the cable can be reduced due to the decreasing lever distance of the shaft axis to the cable. Thus, a weakening of the force of the pneumatic spring can be at least partially cancelled.

According to an example, a vertical retaining profile is provided, to the upper end of which an upper end of the spring element is attached. The cable reel is rotatably held at the lower end of the spring element. In a lower segment, the retaining profile has a vertical guide for the other end of the spring element and a vertically extending toothed profile. The cable reel is connected to a toothed wheel which meshes in the toothed profile and rotates the winding reel.

According to an example, the vertically sliding facade component is a vertical sliding window that has at least one movable sash.

The term "vertical sliding window" refers to a window in which at least one window sash can be opened or closed by sliding vertically.

Vertical sliding windows can also be called vertical slideable windows.

In another example, sliding facade components are provided in the form of other facade manipulators. Facade manipulators, also referred to as manipulators for use in the facade or building envelope, are used, for example, to change the interaction between the inside and outside of a building. Manipulators are, for example, shading elements, anti-glare elements, privacy elements, blackout elements or ventilation elements. Manipulators can also be designed as light-directing elements.

According to another example, the spring element forms a first force element and the driving force forms a first force. The compensator has a second force element that provides a second force that compensates for the decreasing spring force of the first actuator when moving from the compressed state to the expanded state such that a resulting force is provided as the output force that decreases less than the first force for compensating for the weight of the vertically displaceable facade component.

The term "resultant force" refers to the force resulting, i.e. the effective force.

In an example, the resulting force has a more constant curve than the first force without the second force.

In an example, the resulting force has a smoother curve than the first force without the second force.

In an example, the resulting force is constant.

If the spring element has an increasing value when moving from the compressed state to the expanded state, the second force element is designed to compensate for this force in the same decreasing manner.

In an example, the second force element and the first force element are matched such that compensation occurs at least in part.

In an example, the second force element and the first force element are matched to each other such that compensation occurs to a large extent.

In an example, the second force element and the first force element are matched to each other such that compensation is almost complete. The term "almost" here refers to the compensation that is recognizable to the user. When moving the sliding facade component, the user should have the impression that he or she has to apply a constant force to overcome friction, for example.

In an option, the second force element is provided as the second force providing an increasing compensation force acting in the direction of the first force.

In another option, the second force element is provided to provide as the second force a decreasing compensation force that acts in opposition to the first force.

According to the invention, a weight compensation device for vertically displaceable facade components is also provided. The weight compensation device has a spring element for at least partial compensating of a weight of a vertically displaceable facade component and a compensator. The spring element provides a spring force as a driving force for lifting the vertically displaceable facade component. The spring element is movable between a compressed state and an expanded state. The spring force has a decreasing value when moving from the compressed state to the expanded state. The compensator at least partially compensates for the decrease in driving force and provides an output force that decreases less than the driving force. The compensator has a gear mechanism between a force input and a force output, the gear ratio of which changes as the compensator moves from the compressed state to the expanded state. The gear mechanism has a cable reel mounted on a shaft, on which a cable connectable to the vertically displaceable facade component can be wound. The cable reel has a decreasing winding circumference for a winding cable. The shaft has a gear that meshes with a fixed toothed rack profile. The shaft is movable by the spring element in the direction of the toothed rack profile to thereby rotate the cable reel for winding and un-winding the cable.

According to the invention, there is also provided an adaptable weight compensation kit for vertically displaceable facade components. The weight compensation kit comprises at least one compensation device according to one of the preceding examples. The spring element is adjustable in its spring effect when installed. Alternatively or supplementarily, the compensator comprises a gear mechanism for transmitting force, wherein a gear transmission ratio of the transmission device is adjustable.

The weight compensation kit may also be referred to as a weight compensation system, a weight compensation kit for vertically sliding facade components, or a weight compensation kit for vertically sliding facade components.

The weight compensation kit can be adapted to a respective sash weight of a vertical sliding window by simple design adjustments. Due to the adaptations it is possible, for example, to use different glazing and different pane formats and sizes for the same basic construction. The weight compensation kit can be modified for individual deviations due to its adaptability.

In an example, the weight compensation device is adaptable to a weight of the vertically displaceable facade component in a range from 10 to at least 50 kg, e.g. at least 100 kg, e.g. at least 200 kg, e.g. at least 400 kg.

According to the invention, there is also provided a facade module comprising a vertically displaceable facade component and at least one weight compensation device or weight compensation kit according to any of the preceding examples. The at least one weight compensation device or weight compensation kit is connected to the vertically displaceable facade component and at least partially compensates the weight.

In an option, at least one vertically movable facade component is designed as a vertically movable window element.

In another option, two of the weight compensators are provided for the vertically sliding facade component.

According to the invention, a method for moving a vertically displaceable facade component is also provided. The method comprises the following steps:

a) Applying a holding force to a vertically displaceable facade component for at least partially compensating the weight of the vertically displaceable facade component by a spring element. The spring element provides a spring force as a driving force for lifting the vertically displaceable facade component, and the spring element is moved between a compressed state and an expanded state. The spring force has a decreasing value when moving from the compressed state to the expanded state.

b) Providing a compensator that at least partially compensates for a decreasing driving force and provides an output force that decreases less than the driving force.

According to an aspect of the invention, a pneumatic cylinder is provided as a means of compensating for the weight of a vertically movable component. To compensate for the decreasing force of the pneumatic cylinder, mechanical compensation is provided so that a more uniform compensation of the weight is obtained for the user when moving. This improves user comfort.

The provision of a compensator also enables precise positioning of the vertically sliding component, as the position can be adjusted exactly. By compensating the spring force, it is possible, for example, to precisely balance the window sash.

It should be noted that the features of the embodiments of the weight compensation device for vertically displaceable facade components or of the facade module also apply to embodiments of the method for moving a vertically displaceable facade component and vice versa. Furthermore, also those features can be freely combined with each other where this is not explicitly mentioned.

BRIEF DESCRIPTION OF THE DRAWINGS

In the following, examples of embodiments of the invention are described in more detail with reference to the accompanying drawings.

DETAILED DESCRIPTION OF EMBODIMENTS

Figure 1:
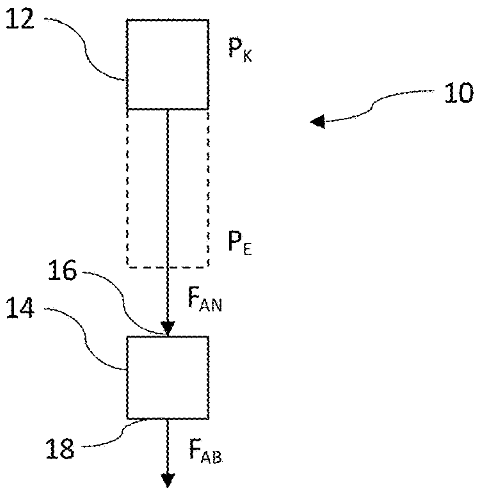
FIG. 1 shows an example of a weight compensation device in a schematic functional diagram.

FIG. 1 shows an example of a weight compensation device 10 for vertically displaceable facade components in a schematic functional diagram. The weight compensation device 10 has a spring element 12 for at least partially compensating a weight of a vertically displaceable facade component. The weight compensation device 10 also comprises a compensator 14. The spring element 12 provides a spring force as a driving force $F_{AN}$ for lifting the vertically displaceable facade component. The spring element 12 is movable between a compressed state $P_K$ and an expanded state $P_E$. The spring force has a decreasing value when moving from the compressed state $P_K$ to the expanded state $P_E$. The compensator 14 at least partially compensates for the decrease in the input force and provides an output force $F_{AB}$ that decreases less than the input force $F_{AN}$.

In an option, the compensator 14 is provided with a force input 16 and a force output 18. A gear mechanism is provided between the force input 16 and the force output 18, the gear transmission ratio of which becomes smaller when moving from the compressed state to the expanded state, and vice versa.

Figure 2A:
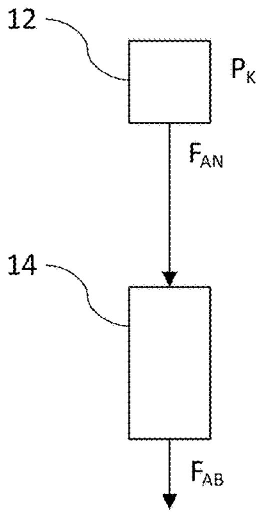
FIG. 2A shows the example from FIG. 1 with a spring element in a compressed state.
Figure 2B:
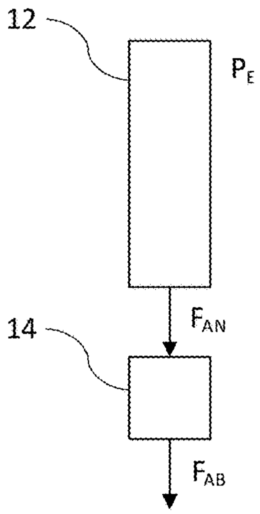
FIG. 2B shows the example from FIG. 1 or FIG. 2A with the spring element in an expanded state.

In FIG. 2A, the compensation device 10 of FIG. 1 is shown with the spring element 12 in the compressed state $P_K$. In FIG. 2B, the weight compensation device 10 from FIG. 1 is shown with the spring element 12 in the expanded state $P_E$. Purely symbolically, it is indicated that the driving force $F_{AN}$ is greater in the compressed state $P_K$ than in the expanded state $P_E$. The compensator 14 is indicated with a frame of different size to indicate that the compensator 14 has a different compensating effect on the driving force $F_{AN}$ in the compressed state $P_K$ and the expanded state $P_E$ in such a way that the output force $F_{AB}$ differs to a lesser extent, and in particular decreases to a lesser extent, than the driving force $F_{AN}$. Preferably, the output force $F_{AB}$ is constant.

Figure 3:
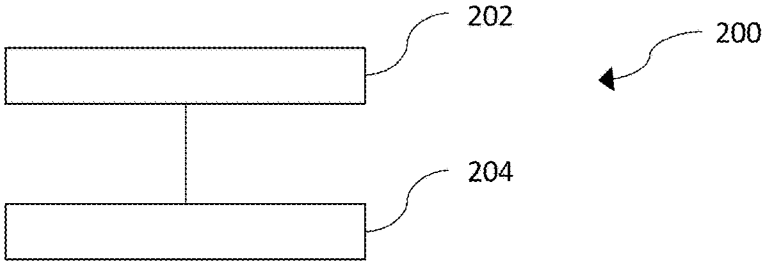
FIG. 3 shows an example of a method for moving a vertically movable facade component.

FIG. 3 shows an example of a method 200 for moving a vertically displaceable facade component. The method 200 comprises the following steps:

In a first step 202, also referred to as step a), a holding force is applied to a vertically displaceable facade component for at least partially compensating the weight of the vertically displaceable facade component by a spring element. The spring element provides a spring force as a driving force for lifting the vertically displaceable facade component; the spring element is moved between a compressed state and an expanded state. The spring force has a decreasing value when moving from the compressed state to the expanded state.

In a second step 204, also referred to as step b), a compensator is provided to at least partially compensate for a decreasing driving force and provide an output force that decreases less than the driving force.

For example, the first step 202 and the second step 204 occur simultaneously.

Figure 4A:
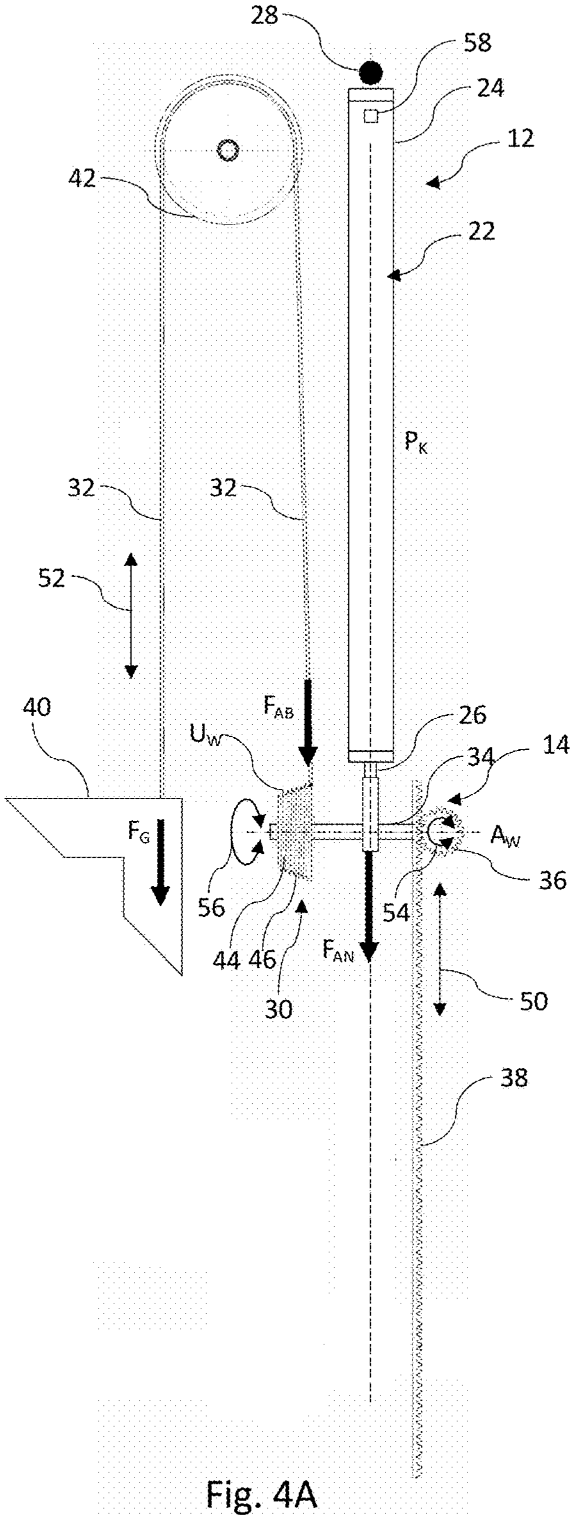
FIG. 4A shows another example of a compensation device in a schematic diagram with the spring element in the compressed state.
Figure 4B:
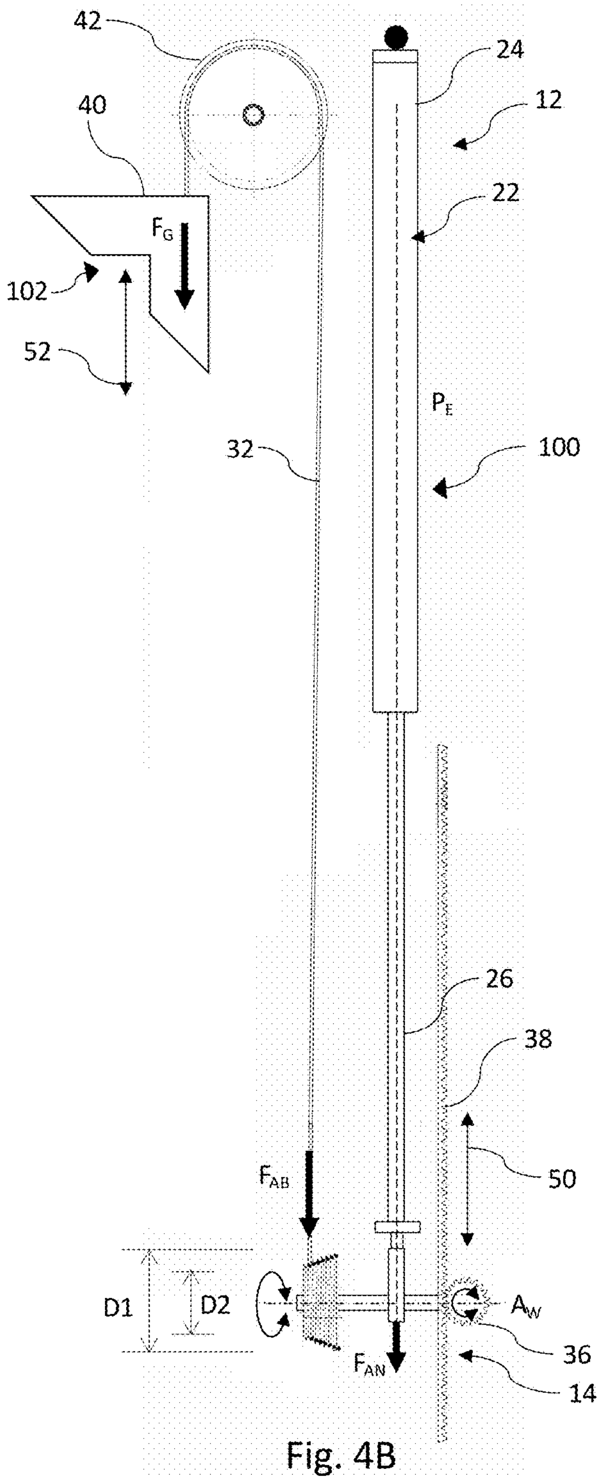
FIG. 4B shows the example from FIG. 4A with the spring element in the expanded state.

FIG. 4A and FIG. 4B show another example of the compensation device 10 in a schematic view. The spring element 12 is, for example, a linear spring element. In the option shown in FIG. 4A and FIG. 4B, the spring element 12 is a pneumatic spring 22. The pneumatic spring has a cylinder 24 and a piston 26; the cylinder 24 can be supported at one end 28 at a holding point in a facade.

In FIG. 4A, the spring element 12 is shown in the compressed state $P_K$ and in FIG. 4B, the spring element 12 is shown in the expanded state $P_E$.

It should be noted that in FIG. 4A and FIG. 4B, the assembled state is shown as an option in connection with the indicated vertically movable facade component.

In an option, the gear mechanism is provided with a cable reel 30 on which a cable 32 can be wound, which can be connected to the vertically displaceable facade component. The cable reel 30 is rotationally driven by the spring element 12. The cable reel 30 has a decreasing winding circumference $U_W$ for a winding cable.

In another option, the gear mechanism is provided with a shaft 34 having a shaft axis $A_W$, which is rotatably drivable by the spring element 12 on a drive side and which has the cable reel 30 on a driven side.

In an option, the shaft 34 is provided with a gear wheel 36 on the drive side, which meshes in a fixed toothed rack profile 38. The spring element 12 moves the shaft 34 with the gear wheel 36 attached to it linearly transverse to the shaft axis $A_W$ and thereby drives the shaft 34 in rotation. (In FIG. 4A and FIG. 4B, this is shown somewhat distorted in perspective to better illustrate the functional relationship). For example, the cable 32 is attached to the cable reel 30 and can be wound and un-wound by rotating the cable reel 30. The cable 32 can be wound onto the cable reel 30 by moving the spring element 12 from the compressed state $P_K$ to the expanded state $P_E$.

As an option, it is provided that the gear wheel 36 is replaceable and differently sized gears are provided (not shown) with which the lifting force and lifting height of the compensation device can be changed.

In an option, the piston 26 is connected at its end to the shaft 32. As the piston 26 is extended, the shaft 32, which is rotatably mounted on the end of the piston 26, can be driven via the gear wheel and toothed rack profile. With the cable reel 30 attached to the shaft 32, as the winding circumference decreases, a torque for winding the cable can be reduced due to the decreasing lever distance of the shaft axis from the cable, thereby at least partially negating a weakening of the force of the pneumatic spring.

The cylinder 24 is supportable at its free end at the holding point of the facade, that is, at the end opposite the opening of the cylinder 24. The open end of the cylinder 24 is the area where the piston 26 is provided. The piston 26 is connected to the shaft 34 at its free end, that is, at the end opposite a bottom of the cylinder 24.

In the example shown in FIG. 4, the cylinder 24 of the pneumatic spring 22 has its end 28 fixable, i.e. mountable, at an upper region. The other end faces downward and the piston 26 moves downward out of the cylinder 24 as it moves from the compressed state $P_K$ to the expanded state $P_E$. Attached to the free end of the piston 26 is the shaft 34, which meshes with the gear wheel 36 in the toothed rack profile 38. Moving the piston 26 downward also moves the shaft 34 downward. As the gear wheel 36 on the shaft 34 engages the rack and pinion profile 38, the shaft 34 rotates in a first direction. As a result, the cable reel 30 mounted on the shaft 34 is rotated about the shaft axis $A_W$ and simultaneously displaced downward. The cable reel 30 has a first region with a first diameter D1 and a second region with a second diameter D2. The first diameter D1 is larger than the second diameter D2. This also results in a changing winding circumference.

The winding circumference in turn means a changing lever. The cable reel 30 with the conical body therefore provides a variable lever.

The cable 32 is attached to the cable reel 30, which is connected to the vertically displaceable facade component 40, e.g. a vertical sliding window. The cable 32 runs from the cable reel 30 upwards and there over a deflection pulley 42, which is fixable, i.e. mountable, at an upper area. The vertically movable facade component 40, e.g. the vertical sliding window, is then held suspended from the free end of the cable. An arrow $F_G$ indicates the weight force of the vertically sliding facade component 40 resulting from its own weight.

The pneumatic spring 22 thus acts on the vertically sliding facade component 40, e.g., the vertical sliding window, with an upwardly acting force, i.e. a lifting force or lifting force.

In FIG. 4A and FIG. 4B it is shown that the lifting movement acting on the window sash is composed of a first movement portion and a second movement portion. On the one hand, the cable reel 30 is displaced downward, which means a first movement component. On the other hand, the cable 32 is wound up by the rotating cable reel 30, which means a second movement component.

In FIG. 4A, a valve 58 is provided as an option, which is inserted at the pneumatic spring 24 transverse to the spring direction. The valve 58 is accessible in the installed state. The pneumatic spring can be filled and emptied via the valve 58, so that the spring force can be changed in the installed state. For example, the pneumatic spring 24 can be adjusted for a sash weight in a range between 10 and 400 kg when installed.

The valve 58 is also provided as an option in the other embodiments shown or described.

The vertically movable facade component 40, for example the vertical sliding window, is movable from a first, lower position P1 to a second, upper position P2 and vice versa. The lower position P1 may be a closed position in case of a vertical sliding window, for example, and the upper position P2 may be an open position.

In the first/lower position P1 of the vertically displaceable facade component, the pneumatic spring 22 is compressed and acts with a first force on the vertically displaceable facade component 40 via the shaft 34, the cable reel 30 and the cable 32. The pneumatic spring acts with a rotating driving force on the cable reel 30.

In the first/lower position of the vertically displaceable facade component, the cable 32 is held on the cable reel 30 in the first area with the first diameter D1.

When the vertically sliding facade component 40 is lifted and moved to the second/upper position P2, the cable 32 is increasingly wound on the cable reel 30.

In the second/upper position P2 of the vertically displaceable facade component 40, the cable 32 is held on the cable reel 34 in the second area with the second diameter D2.

In the first/lower position P1 of the vertically displaceable facade component 40, the power transmission from the shaft 34 to the vertically displaceable facade component 40 takes place via the larger diameter of the cable reel 30, i.e. with a larger lever (than in the second/upper position P2).

In the second/upper position P2 of the vertically displaceable facade component 40, the power transmission from the shaft 34 to the vertically displaceable facade component 40 takes place via the smaller diameter of the cable reel, i.e. with a smaller lever (than in the first/lower position P1).

When the pneumatic spring piston is inserted in the first/lower position P1, a high torque (in relation to the second/upper position P2) acts on the shaft 34. The cable reel 30 is then un-wound, so that there is then a long lever (in relation to the second/upper position P2).

When the pneumatic spring piston is extended in the second/upper position P2, a low torque (in relation to the first/lower position P1) acts on the shaft 34. The cable reel 30 is then wound up, so that there is then a short lever (in relation to the first/lower position P1).

The transmission of the pneumatic spring force through the gear wheel 36 and the toothed rack profile 38 to the shaft 34 and thus the cable reel 30 is constant. In other words, the lever for transmitting force from the pneumatic spring 22 to the cable reel 30 is constant. However, the force from the pneumatic spring, i.e. the driving force, is not constant, i.e. variable. The spring force decreases from the compressed state (first/lower position P1) to the expanded state (second/upper position P2). Thus, the force on the shaft 34 is also not constant.

The transmission of the rotational force from the shaft 34 or from the cable reel 30 (via the deflection pulley 42) to the vertically displaceable facade component 40 is variable via the path of the pneumatic spring. In other words, the lever for transmitting force from the pneumatic spring 22 to the cable reel 30 is not constant, i.e. variable. The force acting on the cable reel 30 is also variable. The variability of the lever is set up for the variability of the force acting on the cable reel in such a way that the two variabilities balance each other out: The holding force acting on the cable, i.e. the output force, is constant, i.e. not variable.

The force of the pneumatic spring 22 and the transmission through the gear mechanism, i.e. the compensator, are matched in such a way that the weight force of the vertically displaceable element is compensated by the output force acting on the cable 32. The user can thus very easily move the vertically displaceable element manually, i.e. raise or lower it.

If the output force is too great, the vertically displaceable element 40 is lifted and, at least without being locked, unintentionally moved upwards.

If the down force is too small, the user will have to apply a larger opening force and the vertically sliding element 40 will unintentionally move down again after being released, at least without being locked.

When the window (or other vertically movable element 40) is raised, an additional upward force (i.e. counteracting the weight force) is applied to the window so that the spring force of the pneumatic spring 22 can push the shaft 34 of the cable reel 30 downward. The cable reel 30 is rotated by the rotation of the shaft, thereby winding up the cable.

Irrespective of the cable reel rotation, the load, i.e. for example the vertical sliding window, is lifted by the stroke of the piston.

Simultaneously with the extension of the piston of the pneumatic spring 22 and the resulting weakening of the force of the pneumatic spring 22, the shaft 34, which is rotatably mounted at the end of the piston 26, is driven via the gear wheel 36 and the toothed rack 38. In the process, the torque of the shaft 34, i.e. the cable reel 30, decreases. Thus, the lever on the cable reel 30 changes due to the changing distance of the shaft axis from the cable; as the cable on the cable reel increases, the lever becomes shorter. In this case, the weakening of the force of the pneumatic spring is cancelled out by the shortening of the lever.

As the stroke of the piston increases, the force of the pneumatic spring 22 decreases (compression or characteristic curve). This is accompanied by a reduction in the torque of the shaft. The torque is therefore variable.

In an option, the cable reel 30 is provided with a cone-shaped winding body 44 in which a spirally extending winding groove 46 is provided for receiving the cable 42.

A first double arrow 50 indicates the vertical movement of the shaft 34 and thus also of the cable reel 30. A second double arrow 52 indicates the vertical movement of the vertically movable facade component 40. A first rotational arrow 54 indicates the resultant rotational movement of the gear wheel 36, and a second rotational arrow 56 indicates the resultant rotational movement of the shaft 34 and thus the cable reel 30.

It should be noted that lateral guides of the vertically sliding facade component 40 are not shown.

In an option, the vertically sliding facade component 40 is a vertical sliding window (not shown in more detail) having at least one movable sash.

In another option (not shown), the spring element 12 is provided to form a first force element and the driving force forms a first force. The compensator 14 has a second force element that provides a second force that compensates for the decreasing spring force of the first actuator as it moves from the compressed state to the expanded state, such that a resultant force is provided as the output force to compensate for the weight of the vertically displaceable facade component that decreases less than the first force.

In a first option, it is provided that the second force element provides as the second force an increasing compensation force acting in the direction of the first force. The compensation force compensates for the decreasing spring force of the first force element when moving the first force element from the compressed state to the expanded state.

In a second option, it is provided that the second force element provides as the second force a decreasing compensation force that acts in opposition to the first force. The compensation force compensates for the decreasing spring force of the first force element when moving the first force element from the compressed state to the expanded state.

The resulting force can also be referred to as the supporting force or balancing force.

The force can also be called lifting force to lift the window. In the installed state, the (lifting) force is acting in the opposite direction to the weight force of the sliding facade component. In case of a window sash, the weight force is mainly caused by the weight of the pane(s) and by the sash frame construction.

In an example, a weight compensation device for vertically displaceable facade components is provided, which has a force element that provides a force for lifting a vertically displaceable facade component for at least partially compensating its own weight. A second force element is also provided. The force element is a spring element movable between a compressed state and an expanded state. The spring element provides a spring force that has a decreasing value when moving from the compressed state to the expanded state. The second force element provides a second force that compensates for the decreasing spring force of the first force element when moving from the compressed state to the expanded state such that a resultant force that decreases less than the first force is provided to compensate for the weight of the vertically movable facade component.

In another option, a facade module 100 is provided that includes a vertically slidable facade component 102 and at least one example of the weight compensation device 10 according to any of the preceding examples. The at least one weight compensation device is connected to the vertically displaceable facade component and at least partially compensates its own weight.

In an option, the at least one vertically movable facade component is designed as a vertically movable window element.

Additionally, as an option, two of the weight compensation devices are provided for the vertically sliding facade component.

The facade module can also be called the window module.

In an example, a guide is provided for moving the vertically sliding facade component. The weight compensation devices are arranged, for example, in each case at the side of the sliding window element. The term window is also used here in the sense of a window sash.

In another example, a weight compensation device is provided for e.g. the vertically sliding sash of a vertical sliding window. A pneumatic spring is fixedly mounted on a supporting unit at one end, e.g. with the cylinder. The other end, e.g. the piston, is mounted for linear movement, for example in a rail guide. The piston can thus be extended and retracted without obstruction. An axially rotatable shaft is mounted at the end of the piston, normal to the piston. At one end of this shaft, a gear wheel is fixed to the shaft, and at the other end, a cable reel is fixed to the shaft. The gear wheel is guided on a toothed rack. A cable hangs on the cable reel and the window sash to be moved hangs on this cable, for example via a deflection pulley.

When the piston of the pneumatic spring is pushed out, the gear wheel on the rack moves and the shaft is rotated as a result. Because the gear wheel is fixed to the cable reel, the cable reel also rotates. Depending on the direction of rotation of the cable reel, the cable is wound or un-wound on this cable reel.

When the piston of the pneumatic spring is pushed out, the cable reel rotates so that the cable is wound up. The load at the other end of the cable is thus lifted.

When the piston is pushed into the cylinder, cable is un-wound from the cable reel and the load hanging from the end of the cable sinks.

To compensate for the progression of the pneumatic spring, the cable reel is conical, e.g. helical. The cable is fixed at the end of the cable reel with the larger diameter and is wound up in the direction of the smaller cable reel diameter. The constellation pneumatic spring—cable reel thus results in the following situations:

The pneumatic spring is retracted—the cable is on the larger cable reel diameter, long lever.

The pneumatic spring is extended—the cable is on the smaller cable reel diameter, short lever.

If a constant weight is suspended from the other end of the cable, this means that the different position of the cable on the cable reel causes a shorter or longer lever to act on the pivot point of the cable reel. However, a constant weight but levers of different lengths also mean a different torque depending on the position of the cable on the cable reel.

However, this difference in the torque of the cable reel is compensated for by the progressive force curve of the pneumatic spring:

Pneumatic spring pushed in=>high torque—cable on large diameter=>long lever

Pneumatic spring extended=>low torque—cable on small diameter=>short lever

If the ratio of the taper of the cable reel is adjusted to the progression of the pneumatic spring, the uneven force progression of the pneumatic spring can be compensated via unequal length levers on the cable reel and the load at the end of the cable can be kept in balance.

Another effect that occurs when the cable reel is moved by pushing out the piston of the pneumatic spring is that this raises the load independently of the spooling of the cable. This effect allows the size of the cable reel and the turns on it to be reduced.

Different loads can be compensated for simply by filling the pneumatic spring in different ways. The term “different filling” refers to different pressure due to different filling by different amounts of filling gas or other suitable fluids. The term “different filling” also refers to different gases or other suitable fluids.

Another way to compensate for the different counterweights is to change the cable reel diameter or the diameter of the gear. A combination of different measures is also possible. In addition to changing the cable reel diameter, the ratio of the large diameter to the small diameter can also be adjusted.

The shaft can be set in motion in combination with the pneumatic spring in different ways: Gear—rack, sprocket—chain, cable reel—cable, or belt pulley—belt. There are several options for the suspension of the counterweight: cable, chain and/or belt.

In another example, a weight compensation is provided that includes the following assemblies: spring element, gear mechanism with a conical reel, a shaft and at least one gear, a rack, a pulley and a counterweight or the wings.

Figure 5A:
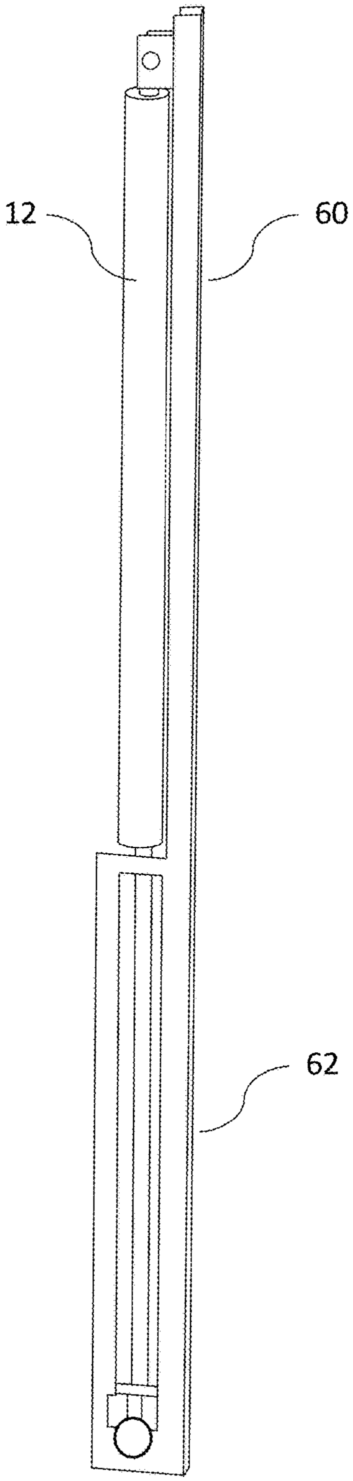
FIG. 5A shows an example of the compensation device with a vertical retaining profile in a first side view.
Figure 5B:
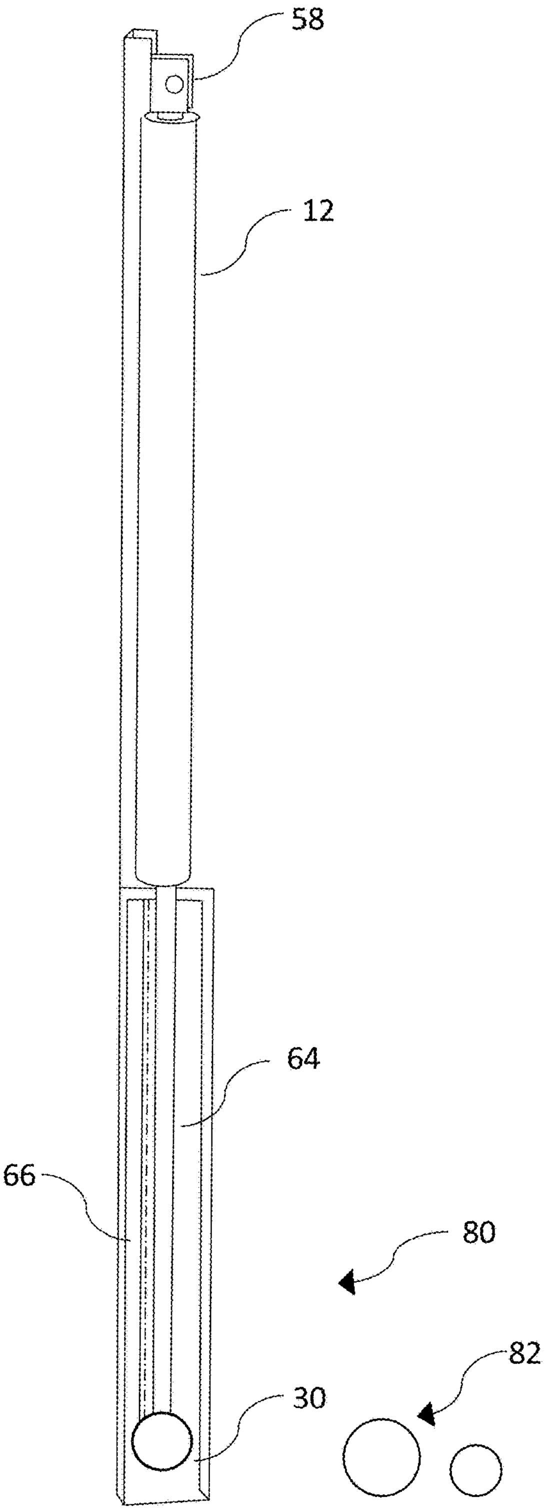
FIG. 5B shows the example of FIG. 5A in a second side view.

FIG. 5A shows an example of the compensation device 10 with a vertical retaining profile 60 in a first side view. The upper end of the vertical retaining profile 60 is an upper end of the spring element 12 attached. The lower end of the spring element 12 rotatably supports the cable reel 30. FIG. 5A and FIG. 5B show the spring element 12 in an extended, i.e. expanded, state.

The retaining profile 60 has a vertical guide 64 in a lower segment 62 for the other end of the spring element 12 and a vertically extending toothed profile 66. The cable reel 30 is connected to a gear wheel (hidden in the figures) which meshes with the tooth profile 66 and rotates the cable reel 30.

In an example, the gear wheel is formed with a pinion profile with a rounded tooth profile and the rack segment has a rounded tooth profile. This ensures the lowest possible noise level when moving a sash, i.e. a low-noise mechanism.

In an example, the vertical retaining profile 60 has an upper region that extends along the spring element, for example a pneumatic spring. The upper region is used to connect to the lower region and to transfer force to the facade or wall structure. The upper region has, for example, a U-shaped profile in cross-section so as to be able to absorb and transmit more force. The vertical retaining profile 60 also has a lower region extending along the area that the spring element can expand or extend in an expanded state. The lower region has an area with the rack and pinion profile, but also serves to transfer force to the facade or wall structure. For example, the lower area has a U-shaped profile in cross-section so as to be more stable. The upper and lower sections are offset by 90° (about a longitudinal axis), for example. The upper and lower regions of the retaining profile 60 are formed, for example, from a metal sheet by laser cutting and folding.

FIG. 5B shows a second side view of the example in FIG. 5A.

As an option, an adaptable counterweight kit 80 for vertically movable facade components is shown in FIG. 5B. The weight compensation kit 80 has at least one compensation device according to one of the preceding examples. The spring element 12 is adjustable in its spring effect when installed. Supplementally or alternatively, the compensator comprises a gear mechanism for transmitting power, wherein a gear transmission ratio of the gear mechanism is adjustable. For example, exchangeable gear wheels 82 are provided.

In an option, the spring element is designed as an exchangeable pneumatic cylinder, for example to be able to take loads in a higher range, or to be able to use smaller but more powerful pneumatic cylinders, for example in a very narrow installation space. The interchangeability allows the use of pneumatic springs with different strokes.

Figure 6:
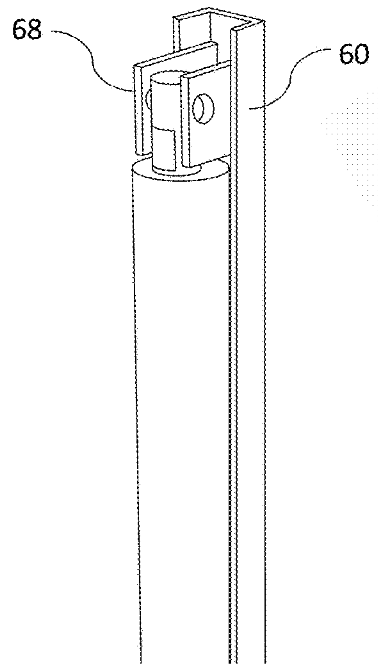
FIG. 6 shows an upper end of the compensation device of FIGS. 5A and 5B with a pneumatic spring held in place.

FIG. 6 shows an upper end of the compensation device of FIGS. 5A and 5B with a held pneumatic spring. The pneumatic spring is held in a holder, for example with a pin 68, which is inserted through a transverse through hole 70.

Figure 7:
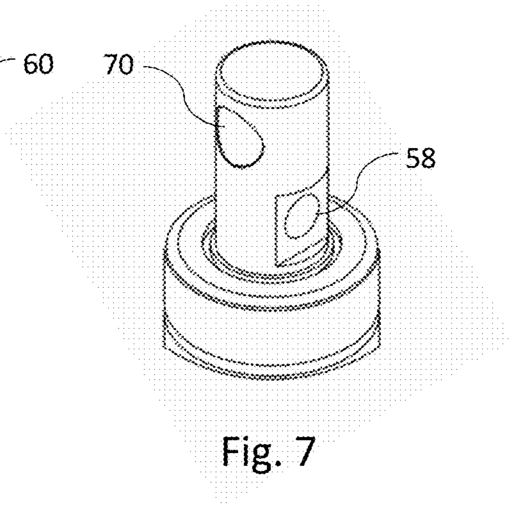
FIG. 7 shows an upper end of the pneumatic spring from FIG. 6 with a valve inserted at the side.

FIG. 7 shows an upper end of the pneumatic spring of FIG. 6 with the inserted valve 58 facing sideways, i.e. toward the room.

Figure 8A:
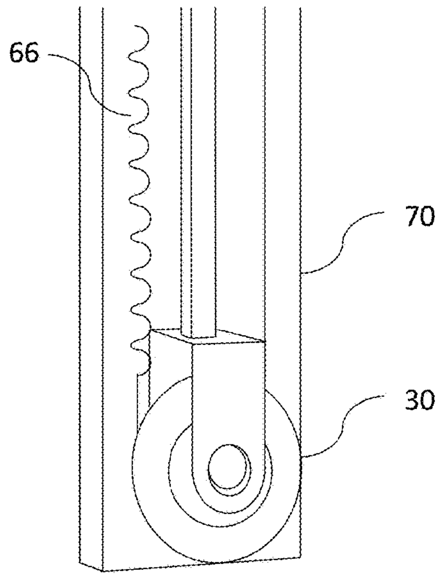
FIG. 8A, FIG. 8B and FIG. 8C show a lower end of the compensation device with the vertical retaining profile of FIG. 6 and a vertically extending tooth profile in different views.
Figure 8B:
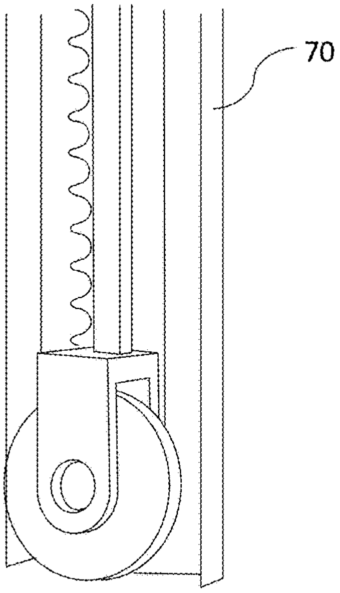
Figure 8C:
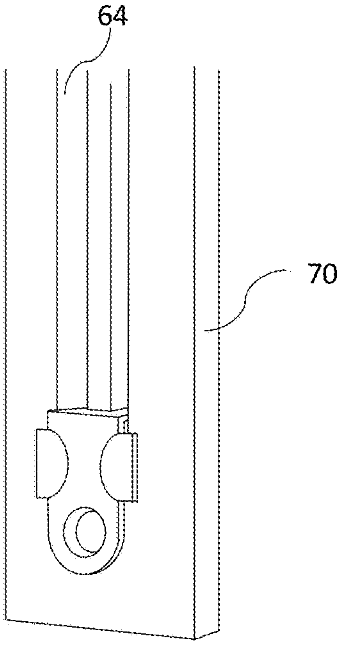

FIG. 8A, FIG. 8B and FIG. 8C show a lower end of the compensation device with the vertical retaining profile 60 of FIG. 6 and the vertically extending tooth profile 66 in different views.

The embodiments described above may be combined in various ways. In particular, aspects of the devices can also be used for the embodiments of the method and vice versa.

In addition, it should be noted that “comprising” does not exclude other elements or steps, and “one” or “a” does not exclude a plurality. It should further be noted that features or steps that have been described with reference to any of the above embodiments may also be used in combination with other features or steps of other embodiments described above. Reference signs in the claims are not to be regarded as a limitation.

The invention claimed is:

1. A weight compensation device for vertically displaceable facade components, comprising:

a spring element for an at least partial compensation of a weight of a vertically displaceable facade component;

a compensator;

wherein the spring element provides a spring force as a driving force (FAN) for lifting the vertically displaceable facade component, and wherein the spring element is movable between a compressed state (PK) and an expanded state (PE);

wherein the spring force has a decreasing value when moving from the compressed state to the expanded state; and wherein the compensator at least partially compensates for the decrease in the spring force and provides an output force (FAB) that decreases less than the spring force, wherein the compensator has a force input and a force output;

wherein a gear mechanism is provided between the force input and the force output, wherein a transmission comprises a cable reel on which a cable is windable that is connectable to the vertically displaceable facade component;

wherein the cable reel is rotatably driven by the spring element;

wherein the cable reel has a decreasing winding circumference for the windable cable, and wherein the spring element displaces the cable reel during the winding process in pulling direction of the cable winding on the reel, so that the vertically displaceable facade component is movable by a stroke composed of two movements, wherein in one movement the cable is windable on the cable reel and wherein in another movement the cable reel is displaceable, and wherein both movements are simultaneously executable.

2. The weight compensation device according to claim 1, wherein the transmission comprises a shaft which is rotatably drivable by the spring element on a drive side and which comprises the cable reel on a driven side.

3. The weight compensation device according to claim 1, wherein the cable reel comprises a cone-shaped winding body in which a spirally extending winding groove is provided for receiving the cable.

4. The weight compensation device according to claim 1, wherein the spring element is a linear spring element; and/or wherein the spring element is formed as a pneumatic spring;

wherein the pneumatic spring is formed as a gas compression spring or a gas tension spring.

5. The weight compensation device according to claim 1, wherein the spring element is formed as a pneumatic spring;

wherein the pneumatic spring includes a valve inserted transversely of the spring direction and accessible when installed; and wherein the pneumatic spring is fillable and drainable via the valve so that the spring force is variable when installed.

6. The weight compensation device according to claim 1, wherein the spring element is formed as a pneumatic spring;

wherein the pneumatic spring, when installed, is adjustable for a sash weight in a range between 10 and 400 kg.

7. The weight compensation device according to claim 1, wherein the spring element is formed as a pneumatic spring;

wherein the pneumatic spring comprises a cylinder and a piston, the cylinder being supportable at one end at a support point in a facade;

wherein the piston is connected at an end thereof to the shaft;

wherein with an extension of the piston, the shaft rotatably supported at the end of the piston is drivable via gear wheel and toothed rack profile; and wherein with the cable reel attached to the shaft with the decreasing winding circumference, a torque for winding up the cable can be reduced due to the decreasing lever distance of the shaft axis to the cable and thus a weakening of the force of the pneumatic spring can be at least partially cancelled.

8. The weight compensation device according to claim 1, wherein the vertically slidable facade component is a vertical sliding window having at least one movable sash.

9. The weight compensation device according to claim 1, wherein the spring element forms a first force element and the driving force forms a first force; and wherein the compensator comprises a second force element providing a second force which compensates for the decreasing spring force of the first force element when moving from the compressed state to the expanded state, such that a resulting force as the output force is provided which decreases less than the first force for compensating the weight of the vertically displaceable facade component;

wherein, the second force element provides as the second force:

i) an increasing compensation force acting in the direction of the first force; or ii) a decreasing compensation force acting against the first force; and wherein the compensation force compensates for the decreasing spring force of the first force element when moving the first force element from the compressed state to the expanded state.

10. A weight compensation device for vertically displaceable facade components, comprising:

a spring element for an at least partial compensation of a weight of a vertically displaceable facade component;

a compensator;

wherein the spring element provides a spring force as a driving force (FAN) for lifting the vertically displaceable facade component, and wherein the spring element is movable between a compressed state (PK) and an expanded state (PE);

wherein the spring force has a decreasing value when moving from the compressed state to the expanded state; and wherein the compensator at least partially compensates for the decrease in the spring force and provides an output force (FAB) that decreases less than the spring force, wherein the compensator has a force input and a force output;

wherein a gear mechanism is provided between the force input and the force output, wherein a transmission comprises a cable reel on which a cable is windable that is connectable to the vertically displaceable facade component;

wherein the cable reel is rotatably driven by the spring element;

wherein the cable reel has a decreasing winding circumference for the windable cable, wherein the transmission comprises a shaft which is rotatably drivable by the spring element on a drive side and which comprises the cable reel on a driven side, wherein the shaft has a gear wheel on the drive side that meshes with a fixed toothed rack profile, and wherein the spring element moves the shaft with the gear wheel attached linearly transverse to the shaft axis and thereby rotationally drives the shaft;

wherein the cable is attached to the cable reel and is windable and un-windable by rotation of the cable reel; and wherein the cable is windable onto the cable reel by moving the spring member from the compressed state to the expanded state.

11. The weight compensation device according to claim 10, wherein the gear wheel is replaceable and different sized gear wheels are provided with which the lifting force and lifting height of the compensation device can be varied.

12. A weight compensation device for vertically displaceable facade components, comprising:

a spring element for an at least partial compensation of a weight of a vertically displaceable facade component;

a compensator;

wherein the spring element provides a spring force as a driving force (FAN) for lifting the vertically displaceable facade component, and wherein the spring element is movable between a compressed state (PK) and an expanded state (PE);

wherein the spring force has a decreasing value when moving from the compressed state to the expanded state; and wherein the compensator at least partially compensates for the decrease in the spring force and provides an output force (FAB) that decreases less than the spring force, wherein the compensator has a force input and a force output;

wherein a gear mechanism is provided between the force input and the force output, wherein a transmission comprises a cable reel on which a cable is windable that is connectable to the vertically displaceable facade component;

wherein the cable reel is rotatably driven by the spring element;

wherein the cable reel has a decreasing winding circumference for the windable cable, wherein a vertical retaining profile is provided, to an upper end to which an upper end of the spring element is attached, and wherein, at a lower end of the spring element, the cable reel is rotatably retained;

wherein the retaining profile comprises, in a lower segment, a vertical guide for the other end of the spring element, and a vertically extending toothed profile; and wherein the cable reel is connected to a toothed wheel which meshes in the toothed profile and rotates the cable reel.

13. A weight compensation device for vertically displaceable facade components, comprising:

a spring element for at least partially compensating a weight of a vertically displaceable facade component;

a compensator;

wherein the spring element provides a spring force as a driving force (FAN) for lifting the vertically displaceable facade component, and wherein the spring element is movable between a compressed state (PK) and an expanded state (PE); wherein the spring force has a decreasing value when moving from the compressed state to the expanded state;

wherein the compensator at least partially compensates for the decrease in the spring force and provides an output force (FAB) that decreases less than the spring force;

wherein the compensator comprises a gear mechanism between a force input and a force output;

wherein a transmission comprises a cable reel mounted on a shaft, on which a cable connectable to the vertically displaceable facade component can be wound; wherein the cable reel has a decreasing winding circumference for the cable;

wherein the shaft comprises a gear wheel meshing with a fixed toothed rack profile; and wherein the shaft is movable by the spring member in the direction of the toothed rack profile to thereby rotate the cable reel for winding and un-winding the cable.

* * * * *